United States Patent

Berwin

[15] 3,699,356

[45] Oct. 17, 1972

[54] RESONANT SWEEP GENERATOR

[72] Inventor: Ted W. Berwin, Los Angeles, Calif.

[73] Assignee: Hughes Aircraft Company, Culver City, Calif.

[22] Filed: Aug. 4, 1971

[21] Appl. No.: 174,572

[52] U.S. Cl. ....................307/228, 178/7.7, 307/270, 315/19, 315/29, 328/184, 328/187, 328/231

[51] Int. Cl. ..............................................H03k 4/08

[58] Field of Search ........178/7.6, 7.7; 307/228, 270, 307/314; 315/19, 29; 328/184, 187, 231

[56] References Cited

UNITED STATES PATENTS

| | | | |
|---|---|---|---|
| 2,809,326 | 10/1957 | Gulnac et al. | 328/184 X |
| 3,315,092 | 4/1967 | Wiley | 307/270 |
| 3,337,748 | 8/1967 | Rusch et al. | 307/270 |
| 3,564,297 | 2/1971 | Elsner | 307/270 X |

*Primary Examiner*—Herman Karl Saalbach
*Assistant Examiner*—R. C. Woodbridge
*Attorney*—W. H. MacAllister, Jr. et al.

[57] ABSTRACT

A resonant sweep generator comprising a diode for coupling a voltage source to a reactance load during a first interval of each operating cycle; a transistor for coupling the voltage source to the load during a second interval of each operating cycle; a compensation bias arrangement which provides improved sweep linearity by forward biasing the diode so as to cause the voltage levels applied to the load during the first and second intervals to be substantially equal; and a drive circuit which allows increased efficiency and speed of operation by controlling the transistor so that it does not saturate.

14 Claims, 7 Drawing Figures

RESONANT SWEEP GENERATOR

BACKGROUND OF THE INVENTION

This invention relates to magnetic sweep circuits in general and especially to resonant sweep generators for applications requiring very linear magnetic sweeps at high flux levels.

The invention herein described was made in the course of or under a contract or subcontract thereunder, with the Department of the Army.

Prior art resonant sweep circuits generally utilize a saturating transistor-diode switch. For some applications this prior art circuit has proven satisfactory, but it does have limitations in regard to linearity, speed and efficiency, and a significant aspect of the subject invention is the recognition of the causes of these limitations and the discovery of ways to overcome them. For example, to provide a linear sweep to a coil of the deflection yoke of a cathode-ray tube the voltage across the coil must be held constant during the sweep period; but in prior art transistor-diode switching arrangements this voltage generally varies by an amount equal to the sum of the forward voltage drop across the diode and the collector to emitter drop of the transistor, when it is gated on. One approach for alleviating the problem associated with this change in voltage level during switching intervals of each operating cycle has been to drive the switching transistor into saturation so that the voltage drop thereacross is minimized. However, this partial solution causes its own problems, for example, a transistor operating in the saturation mode is difficult to turn off quickly, especially high power, high voltage transistors. Also in arrangements where the switching transistor is allowed to operate in the saturation range, when the transistor is being turned off saturation current flows into the collector while the voltage across the transistor rises as a result of the interaction of the inductance of the yoke coil and the capacitance shunted across the coil — a normal type load for resonant sweep generators. Thus the transistor generates, and must dissipate, accessive heat because high current and voltage occur simultaneously. Additionally, there is a time delay required before the transistor may be driven from the saturated state, and this limits the speed of operation of the sweep generator. Also a power stage is usually required to drive the transistor out of saturation at even a moderate repetition rate.

SUMMARY OF THE INVENTION

It is therefore an object of the subject invention to provide a resonant sweep generator which generates a magnetic sweep of improved linearity.

Another object of the invention is to provide a magnetic sweep circuit of increased power efficiency.

Still another object is to provide a magnetic sweep circuit of improved linearity, and which does not require a high power drive circuit to control the switching transistor.

A more particular object is to provide a resonant sweep generator adapted for high flux level applications, which is capable of very linear, efficient, high speed operation, and which allows accurate injection of interlace and "quiescent level adjust" currents.

Briefly, the subject invention includes a diode-transistor switching circuit for coupling a voltage source to a reactance load during first and second intervals, respectively, of each one of a plurality of consecutive operating cycles. A marked improvement in sweep linearity is provided by a compensation bias arrangement which forward biases the diode to cause the voltage applied to the load throughout the first and second intervals of each operating cycle to be substantially constant. Due to the compensation provided by the biasing arrangement, the transistor element of the switching circuit need not be operated in saturation and a novel drive stage is provided for insuring that adequate drive current is applied to the switching transistor for power efficient operation, but that the saturation level is avoided. This technique for driving the transistor element of the switching circuit not only provides increased power efficiency, but allows faster operating speeds. Additionally, a DC circuit path which includes the coil of the deflection yoke is provided to allow the accurate injection of interlace and "quiescent position adjust" currents without degrading the operation of the resonant sweep switching circuit.

BRIEF DESCRIPTION OF THE DRAWINGS

The novel features of this invention as well as the invention itself will be better understood from the accompanying description taken in connection with the accompanying drawings, in which like reference characters refer to like parts and in which.

DESCRIPTION OF THE PREFERRED EMBODIMENTS

Figures 1, 3, 4:
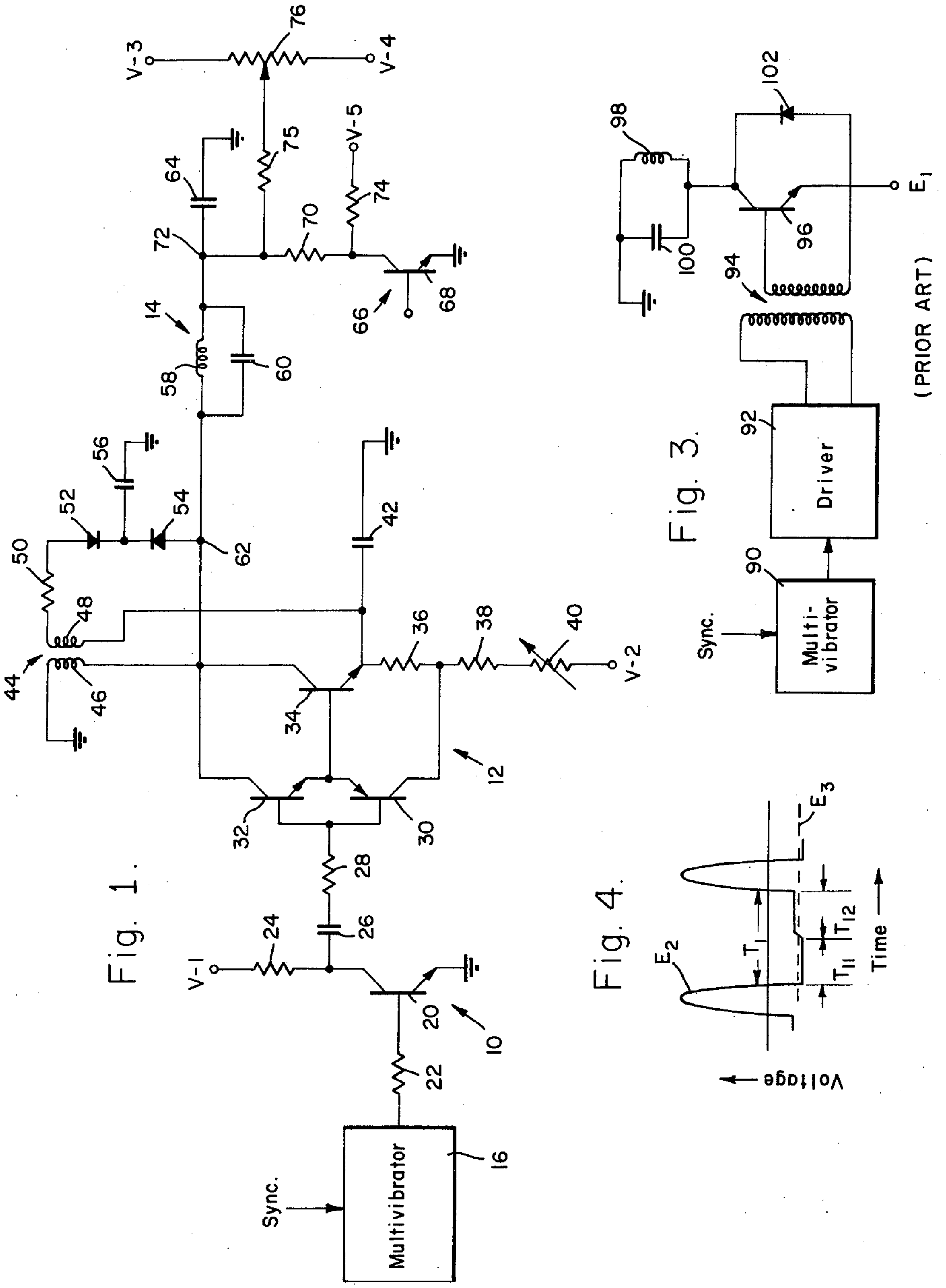
FIG. 1 is a schematic diagram of one preferred embodiment of a resonant sweep generator in accordance with the principles of the subject invention.
FIG. 3 is a schematic diagram of a prior art resonant sweep generator useful for explaining the advantages of the subject invention.
FIG. 4 is a graph of a voltage versus time waveform for explaining the limitations of prior art circuits.

FIG. 1 shows one preferred embodiment of an improved resonant sweep generator in accordance with the invention which may be used, for example, to provide electron beam positioning in cathode-ray tube display systems. Referring now primarily to FIG. 1, the resonant sweep generator there shown includes a drive section 10 which controls a switch section 12 that in turn applies a desired voltage waveform across a reactance load 14.

Section 10 includes a multivibrator 16 which may be synchronized by trigger pulses applied from a synch generator of a display system (not shown). The display sync pulses could be at an 86.2 khz rate, for example, and one of the square waves generated by multivibrator 16 is shown in a waveform 18 of FIG. 2. The output signals from multivibrator 16 are processed by an amplification stage which comprises a transistor 20, a base drive limiting resistor 22, and a resistor 24 coupled between the collector of transistor 20 and a source of positive potential V-1.

The output signals of the amplification stage (transistor 20) are applied through a coupling capacitor 26 and a resistor 28 to the bases of a pair of drive transistors 30 and 32. The emitters of drive transistors 30 and 32 are coupled together and to the base of a switching transistor 34. Resistors 36 and 38 and a potentiometer 40 are coupled between the emitter of transistor 34 and a source of negative potential V-2. The collector of transistor 30 is connected to the junction point between resistors 36 and 38. The collector of transistor 32 is connected to the collector of transistor 34; and a capacitor 42 is connected between the emitter of transistor 34 and a reference potential plane (ground). Capacitor 42 is charged from source V-2 through potentiometer 40 and resistors 36 and 38, and functions as a low impedance voltage source. The switch section 12 further comprises a transformer 44 having a primary winding 46 connected between the collector of transistor 34 and the reference potential plane. The transformer 44 has a secondary winding 48, one end of which is connected to the emitter of transistor 34 and the other end is coupled through a resistor 50 and diodes 52 and 54 to the collector of transistor 34. The anode of diode 52 is connected to the one end of resistor 50, and its cathode is connected to the anode of diode 54 and to one end of a capacitor 56. The other end of capacitor 56 is connected to the reference potential plane. The cathode of diode 54 is coupled to one end of the load 14 as well as to the collector of transistor 34.

Load 14 includes an inductor 58 which may be one of the deflection coils on the yoke of an associated cathode-ray tube. A capacitor 60 is coupled in parallel with coil 58 to form a resonant circuit. One end of the parallel combination of coil 58 and capacitor 60 is connected to a junction point 62 defined by the common point of connection of the collectors of transistors 32 and 34, the primary winding 46 and diode 54. The other end of the parallel combination of coil 58 and capacitor 60 is coupled through a capacitor 64 to the reference potential plane. As will be explained subsequently, capacitor 64 blocks DC current so that interlace and "quiescent beam positioning" DC currents may be conveniently applied through coil 58. However, for non-DC signals (the switching signals) the load 14 may be considered as having one end thereof effectively connected to the reference potential plane; and hence the load 14 is effectively coupled in parallel with the primary of transformer 44 as far as AC operation is concerned.

Interlace current from the display system (not shown) may be applied through a driver stage 66. Driver stage 66 comprises a transistor 68 connected in the grounded emitter configuration with a resistor 70 connected between its collector and a junction point 72 between coil 58 and capacitor 64. DC supply voltage is applied to transistor 68 through a resistor 74 from a source of positive potential V-5. The static or quiescent position of the cathode-ray beam is controlled by a current applied through a resistor 75 from a potentiometer 76. Potentiometer 76 is connected between positive and negative voltage sources V-3 and V-4, respectively.

Parameters used in one configuration of the circuit of FIG. 1 are listed in Table I below. It is understood that these values are included by way of example to provide the fullest possible disclosure and they should not be interpreted in any way to limit the scope of the invention.

TABLE I

| Reference Designation | | Values |
|---|---|---|
| Resistors | 22 | 2.0K ohms |
| | 24 | 2.4K ohms |
| | 28 | 47 ohms |
| | 36 | 20 ohms |
| | 38 | 10 ohms |
| | 40 | 50 ohms (max.) |
| | 50 | 5 ohms |
| | 70 | 680 ohms |
| | 74 | 680 ohms |
| Capacitors | 26 | .01 $\mu$f |
| | 42 | 47 $\mu$f |
| | 56 | 47 $\mu$f |
| | 60 | 3600 pf |
| | 64 | 47 $\mu$f |
| Inductors | 46 | 320 $\mu$h and < 1 ohm |
| | 48 | 30 $\mu$h |
| | 58 | 100 $\mu$h |
| Transistors | 30 | 2N2907 |
| | 32 | 2N3501 |
| | 34 | 2N5553 |
| Voltage Sources | V-1 | +15 volts |
| | V-2 | −25 volts |
| | V-3 | +5 volts |
| | V-4 | −6 volts |
| | V-5 | +5 volts |

Figure 2:
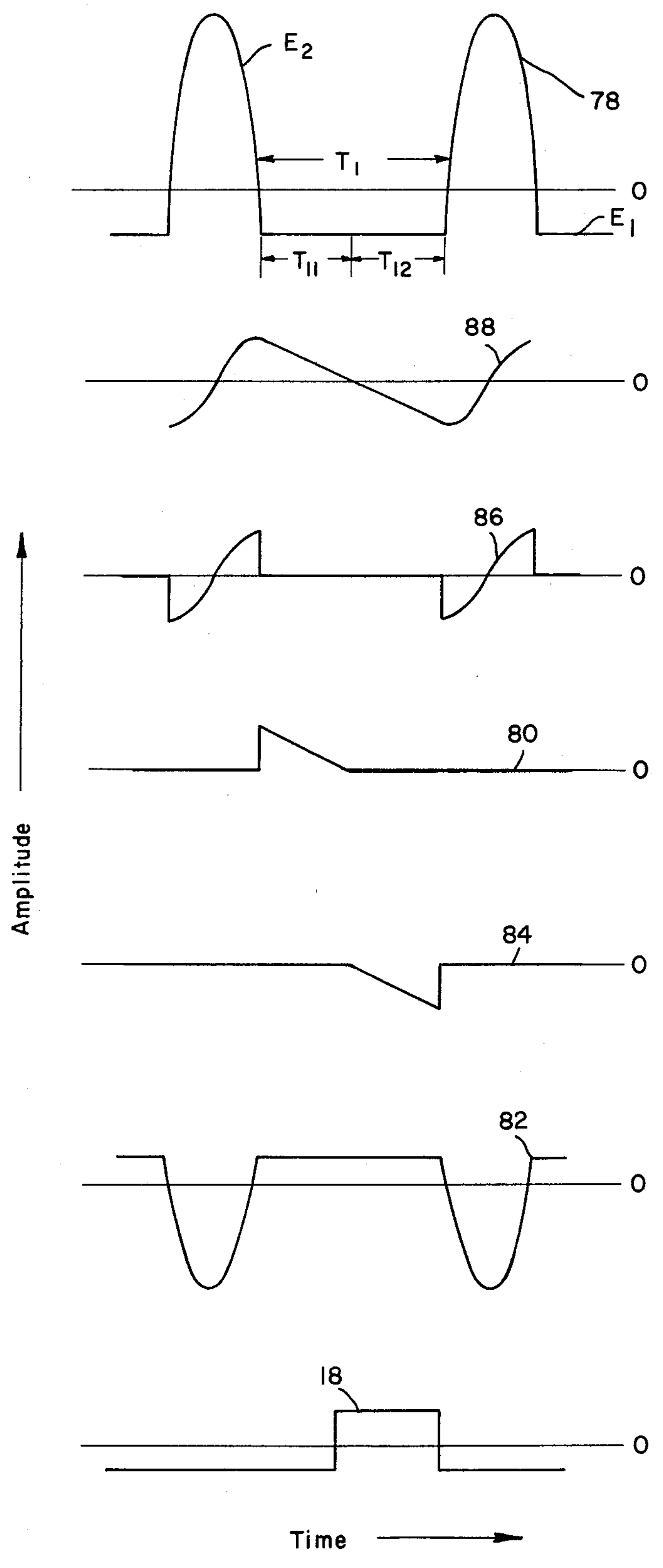
FIG. 2 is a graph of voltage and current amplitudes versus time waveforms for explaining the operation of the resonant sweep generator of FIG. 1.

The voltage across coil 58 during one cycle of operation of the resonant sweep generator of FIG. 1 is illustrated in waveform 78 of FIG. 2. During the time period $T_1$ (see FIG. 2) transistor 34 and diode 54 (with its associated circuitry) operate as a switch to clamp the voltage across coil 58 at approximately the potential $E_1$ stored on capacitor 42. During time period $T_2$ the voltage across coil 58 rises to a peak value of $E_2$.

As shown by diode current waveform 80 of FIG. 2, during the time period $T_{11}$, the first interval of time period $T_1$, diode 54 is conducting and the voltage applied to coil 58 is $E_1$. Capacitor 56 is charged by the voltage generated by secondary winding 48, through resistor 50 and diode 52, to a positive potential. The voltage across secondary winding 48 is shown by a waveform 82 of FIG. 2. During the time period $T_{12}$ the multivibrator 16 (see waveform 18 of FIG. 2) gates transistor 34 on and voltage $E_1$ is applied to coil 58. The waveform of the current through the transistor 34 is shown in a waveform 84 of FIG. 2. The current through the capacitor 60 is depicted by a waveform 86; and the current through the coil 58 by waveform 88. In accordance with the invention, during the time period $T_1$ the voltage across coil 58 is substantially constant. Therefore, the current through the coil and flux or magnetic drive to the cathode-ray tube are the desired linear shape. This results from the compensation bias applied to diode 54 by capacitor 56. Capacitor 56 is charged by transformer 44 to a predetermined potential sufficient to forward bias diode 54 enough so that the voltage $E_1$ is substantially constant.

The advantages of the subject invention may be better understood by reference to the prior art circuit illustrated in FIG. 3. As there shown the output signal from a multivibrator circuit 90 is amplified within a current driver stage 92 and applied through a stepdown transformer 94 to control a transistor 96. The emitter of transistor 96 is connected to a negative source of potential $E_3$ and the collector of the transistor is connected to a resonant circuit comprising a coil 98 and a capacitor 100. A diode 102 is connected across the collector-emitter terminals of transistor 96. The voltage waveform across the coil 98 of the circuit of FIG. 3 during one cycle of operation is shown in FIG. 4. During the time period $T_{11}$, when diode 102 is conducting, the voltage across coil 98 differs from the potential $E_3$ by an amount equal to the voltage drop across diode 102. During the time period $T_{12}$, when the transistor 96 is conducting, the voltage applied to the coil 98 differs from source voltage $E_3$ by an amount equal to the collector-emitter voltage drop of the transistor 96. This just described offset in the voltage applied to the coil 98 causes a nonlinearity in the current therethrough and hence in the magnetic drive to the associated cathode-ray tube (not shown). So one problem inherent with the prior art circuit of FIG. 3 is a nonlinearity in the magnetic sweep as a result of the voltage drops across the transistor and diode. To reduce the magnitude of the nonlinearity the prior art approach has been to minimize the collector-emitter drop of transistor 96 (FIG. 3) by operating the transistor in a saturated mode. However, this technique in turn causes undesirable effects, for example, a transistor operating in saturation is difficult to turn off — especially high power, high voltage types of transistors. During the time period required to turn off the saturated transistor, current flows into its collector; and for the circuit of FIG. 3, during this same time period the voltage $E_2$ on the collector of transistor 96 rises to a very high value, for example, in excess of 100 volts. Thus significant current and high voltage occur simultaneously in the circuit of FIG. 3 and the excessive heat generated within the transistor must be dissipated. Additionally, operating the transistor in the saturated mode causes a reduction in the maximum operating speed of the circuit, and necessitates a medium power stage such as the driver 92 and the stepdown transformer 94, to operate the circuit at even moderate speeds.

The subject invention avoids the problem of nonlinearity caused by offset in the voltage levels applied to the yoke coil between the time period when the diode is conducting and the time period when the transistor is conducting, by the circuitry associated with transformer 44 and capacitor 56 (FIG. 1). During the operation of the circuit of FIG. 1 voltage across the primary of transformer 44 induces voltage in its secondary winding which is used to charge capacitor 56 to a predetermined voltage level. The offset in the voltage levels applied to coil 58 is avoided by the bias to diode 54 supplied by capacitor 56. This aspect of the subject invention can result in an improvement in magnetic sweep linearity by a factor of 10 or more for a typical cathode-ray tube application.

Additionally, due to this just described compensation technique of the subject invention, transistor 34 need not be operated in the saturated mode because its collector-emitter drop is compensated for by the bias provided by capacitor 56. In the configuration of FIG. 1, transistor 34 is driven by a circuit which includes transistors 30 and 32, in such a manner as to prevent transistor 34 from operating in its saturation range. In this arrangement, the collectors of transistors 32 and 34 are coupled together and when the current through transistor 34 reaches a selected range the current gain of transistor 32 decreases due to the drop in its collector voltage — thereby limiting the base drive current to transistor 34.

The configuration of FIG. 1 has the further advantage that DC current required because of losses in the circuit does not flow through coil 58 and hence no offset error in the electron beam position of the associated cathode-ray tube results. Further, position current for controlling the static position of the electron beam may be conveniently inserted at junction point 72 such that it flows through coil 58 and the primary of transformer 44. Also, in the configuration of FIG. 1 interlace current may be conveniently injected by stage 66, such that it too flows through the coil 58 and the primary of transformer 44.

For some high performance applications the gain or linearity of the sweep must not change upon the introduction of interlace current by more than a selected amount, such as 1 part in 3,500, for example. In accordance with the subject invention this requirement can be easily met by having the resistance of the primary of transformer 44 less than 1 ohm, and maintaining its induction constant by using an air core transformer for this element.

Figure 5:
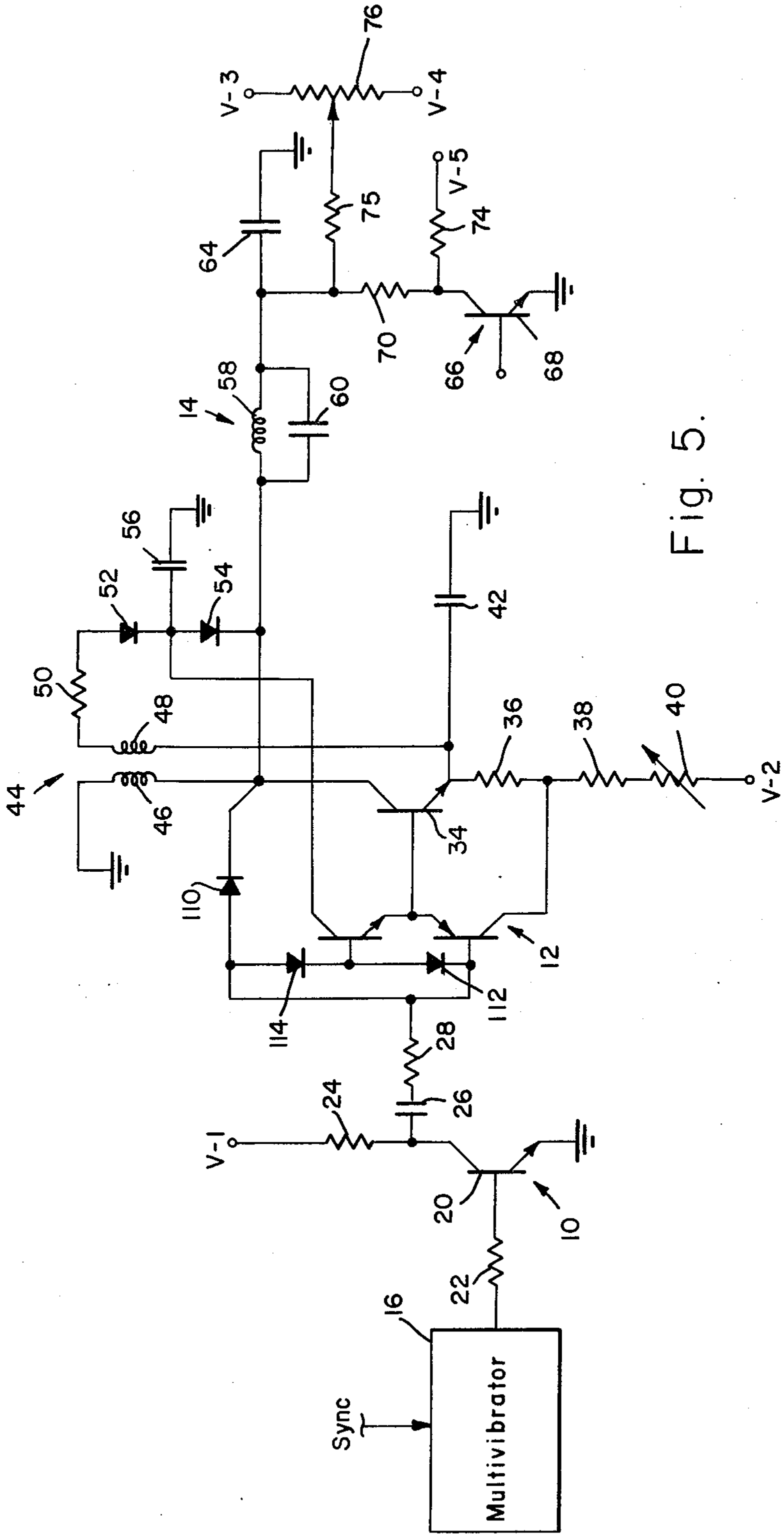
FIG. 5 is a schematic diagram of a second preferred embodiment of the subject invention particularly adapted to applications requiring very high flux levels.

The configuration of the subject invention shown in FIG. 5 is particularly adaptable to applications in which the required flux levels are extremely high, such as those requiring peak currents of 20 amps and peak voltages, $E_2$, in excess of 300 volts, for example. The configurations of FIGS. 1 and 5 are similar and so like parts are designated in FIG. 5 by the same reference numerals as used relative to the description of FIG. 1. The structural difference between the configurations of FIGS. 1 and 5 is the incorporation of diodes 110, 112 and 114 at the input portion of the switch section 12 in FIG. 5 and changing connection of collector of transistor 32 to a lower voltage source (across capacitor 56). Also the transistor types would be changed to handle larger currents. Diode 110 is coupled between resistor 28 and the collector of transistor 34; diode 114 is coupled between resistor 28 and the base of transistor 32; diode 112 is coupled between the bases of transistor 30 and 32; and the base of transistor 30 is connected to resistor 28. The addition of these diodes prevents transistors 30 and 32 from saturating and allows these transistors to be of a low voltage (low cost) type. Also the collector voltage of transistor 34 is better regulated during the conduction period of transistor 34, thereby resulting in a further improvement in the linearity of the magnetic sweep. All the advantages described above relative to FIG. 1 are also provided by the configuration of FIG. 5.

Figure 6:
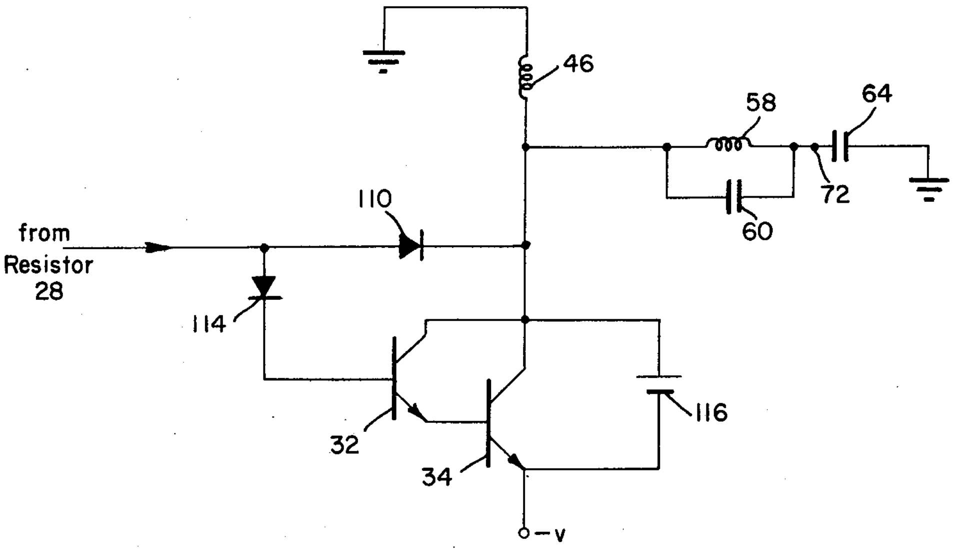
FIGS. 6 and 7 are equivalent circuits of a portion of the sweep generator of FIG. 5 for explaining the operation thereof.
Figure 7:
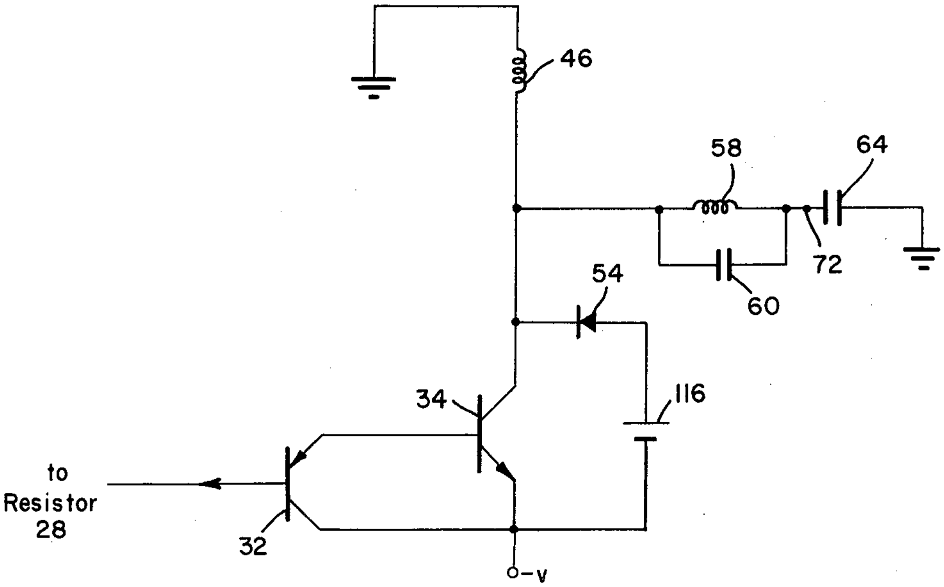

The advantages of the resonant magnetic sweep generator of FIG. 5 may be better understood by considering the simplified equivalent circuits of FIGS. 6 and 7. FIG. 6 is the equivalent circuit of the switch section 12 and load 14 during the time period transistor 34 is conducting; and FIG. 7 is the equivalent circuit for this switch section and load during the time period that transistor 34 is cut off. Battery 116 shown in FIGS. 6 and 7 represents an equivalent voltage source actually implemented by capacitor 56 and its associated circuitry of FIG. 5.

As is evident from FIG. 6, due to the current feedback through diodes 110 and 114 during the conduction period of transistor 34, the voltage at the collectors of transistors 32 and 34 is approximately equal to the voltage at the base of transistor 32. Therefore the collector of transistor 34 is at a potential approximately equal to two "base to emitter voltage drops" above the emitter of transistor 34. Consequently neither transistor 32 nor transistor 34 are allowed to saturate and the collector to emitter voltage rating of transistor 32 need only be a few volts.

FIG. 7 shows the equivalent circuit of switch section 12 during the cutoff period of operation of transistor 34. Since transistor 34 cannot operate in the saturation mode, it may be cut off quite rapidly by the operation of transistor 30. Rapid cutoff is quite important in high flux level applications inasmuch as lingering collector current during the time period of high collector voltage, $E_2$, generates excessive heat. Transistor 34 is typically a high current, high voltage type transistor with a low bandwidth and therefore would be difficult to turn off if allowed to saturate.

Thus there has been described an improved resonant sweep generator in which a compensation bias is provided to prevent sweep nonlinearities due to voltage level shifts between the operation of the transistor and diode portions of the switch; and in which the transistor portion of the switch is operated in a nonsaturating mode. Resonant sweep generators in accordance with the subject invention provide improved sweep linearity, improved power efficiency, and increased sweep rates; as well as allowing accurate interlace current injection, convenient position adjustment, and the use of low voltage, low power drive circuits for controlling the switching transistor.

What is claimed is:

1. In a resonant sweep generator for applying current sweeps to a reactance load during each of a plurality of operating cycles, comprising: a voltage source; a first diode for coupling said voltage source to said load during one interval of each operating cycle; and a first transistor for coupling said voltage source to said load during another interval of each operating cycle; wherein the improvement comprises compensation bias means for biasing said first diode to cause the voltage levels applied to said load during both said intervals of each operating cycle to be substantially equal.

2. The combination of claim 1 wherein said compensation bias means includes a capacitor coupled to said first diode for forward biasing said first diode, and means for charging said capacitor to a preselected potential during each operating cycle.

3. The combination of claim 2 wherein said charging means includes a transformer having a primary winding coupled in parallel with said load and a secondary winding coupled between said voltage source and said capacitor.

4. The combination of claim 3 wherein said secondary winding is coupled to said capacitor through a second diode, with said second diode being poled to charge said capacitor so that said capacitor applies forward bias current to said first diode.

5. The combination of claim 4 further comprising a resistor coupled in series with said secondary winding and said second diode.

6. The combination of claim 1 wherein said compensation bias means includes a transformer having a primary winding coupled in parallel with said load, and a secondary winding; a capacitor coupled to said first diode; and a second diode; said secondary winding and said second diode being series coupled between said voltage source and said capacitor such that said capacitor is charged to a level sufficient to forward bias said first diode to cause the voltage applied across said load to be substantially the same during both said intervals of each operating cycle.

7. The combination of claim 1 further comprising drive means for biasing said first transistor into conduction at less than its saturation level during said another interval of each operating cycle, and for driving said first transistor out of conduction during the remaining intervals of operation.

8. The combination of claim 7 wherein said first transistor has its collector-emitter current path coupled between said voltage source and said load; and said drive means includes an input terminal adapted for receiving gating signals; a second transistor having a base coupled to said input terminal, a collector coupled to the collector of said first transistor, and an emitter coupled to the base of said first transistor; and a third transistor having a base coupled to said input terminal, a collector coupled to the emitter of said first transistor, and an emitter coupled to the base of said first transistor.

9. The combination of claim 7 wherein said first transistor has its collector-emitter current path coupled between said voltage source and said load; and said drive means includes an input terminal adapted for receiving gating signals; and second diode; a second transistor having a base coupled through said second diode to said input terminal, a collector coupled to said compensation bias means, and an emitter coupled to the base of said first transistor; a third transistor having a base coupled to said input terminal, a collector coupled to the emitter of said first transistor, and an emitter coupled to the base of said first transistor; and further comprising a third diode coupled between said input terminal and the collector of said first transistor.

10. The combination of claim 9 further comprising a fourth diode coupled between the bases of said second and third transistors.

11. The combination of claim 7 wherein said compensation bias means includes a capacitor coupled to said first diode, and means for charging said capacitor to a preselected potential.

12. The combination of claim 11 wherein said charging means includes a transformer having a primary winding effectively coupled in parallel with said load and a secondary winding coupled between said voltage source and said capacitor.

13. The combination of claim 12 wherein said charging means includes a fifth diode; said secondary winding is coupled to said capacitor through said fifth diode; and said fifth diode is poled to charge said capacitor so that said capacitor applies forward bias current through said first diode.

14. The combination of claim 3 wherein said load includes an inductor coupled in parallel with a capacitance element, and further comprising means for applying direct current to said load such that the applied direct current flows through said inductor and said primary winding of said transformer.

* * * * *